June 5, 1923.
J. H. BLOODGOOD
1,457,492
UNIVERSAL WOODWORKING TOOL
Filed June 2, 1921
7 Sheets-Sheet 1
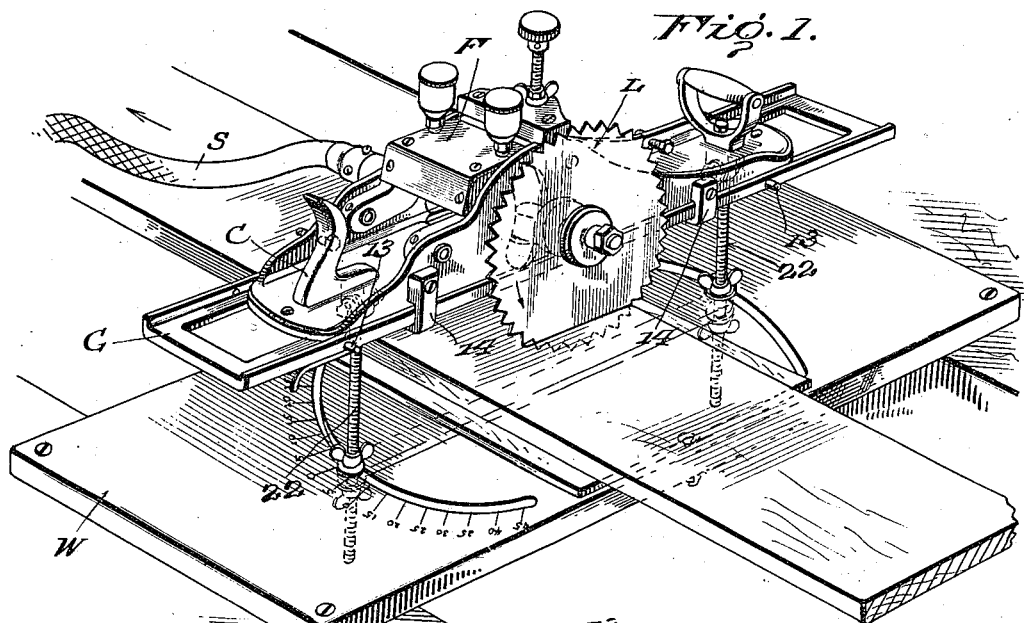
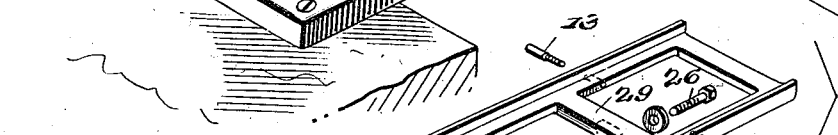
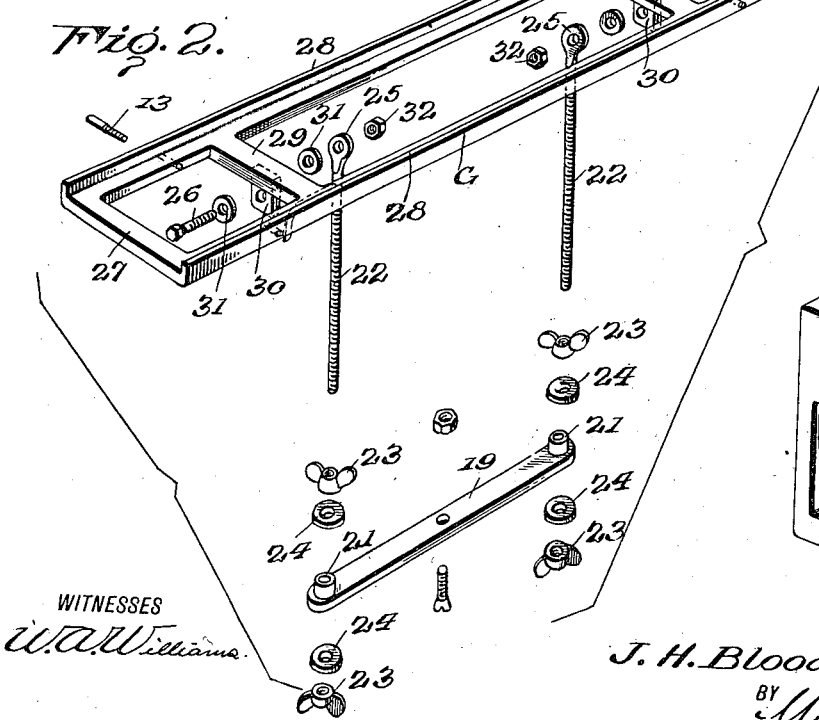
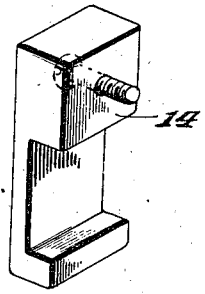
INVENTOR
J. H. Bloodgood
WITNESSES

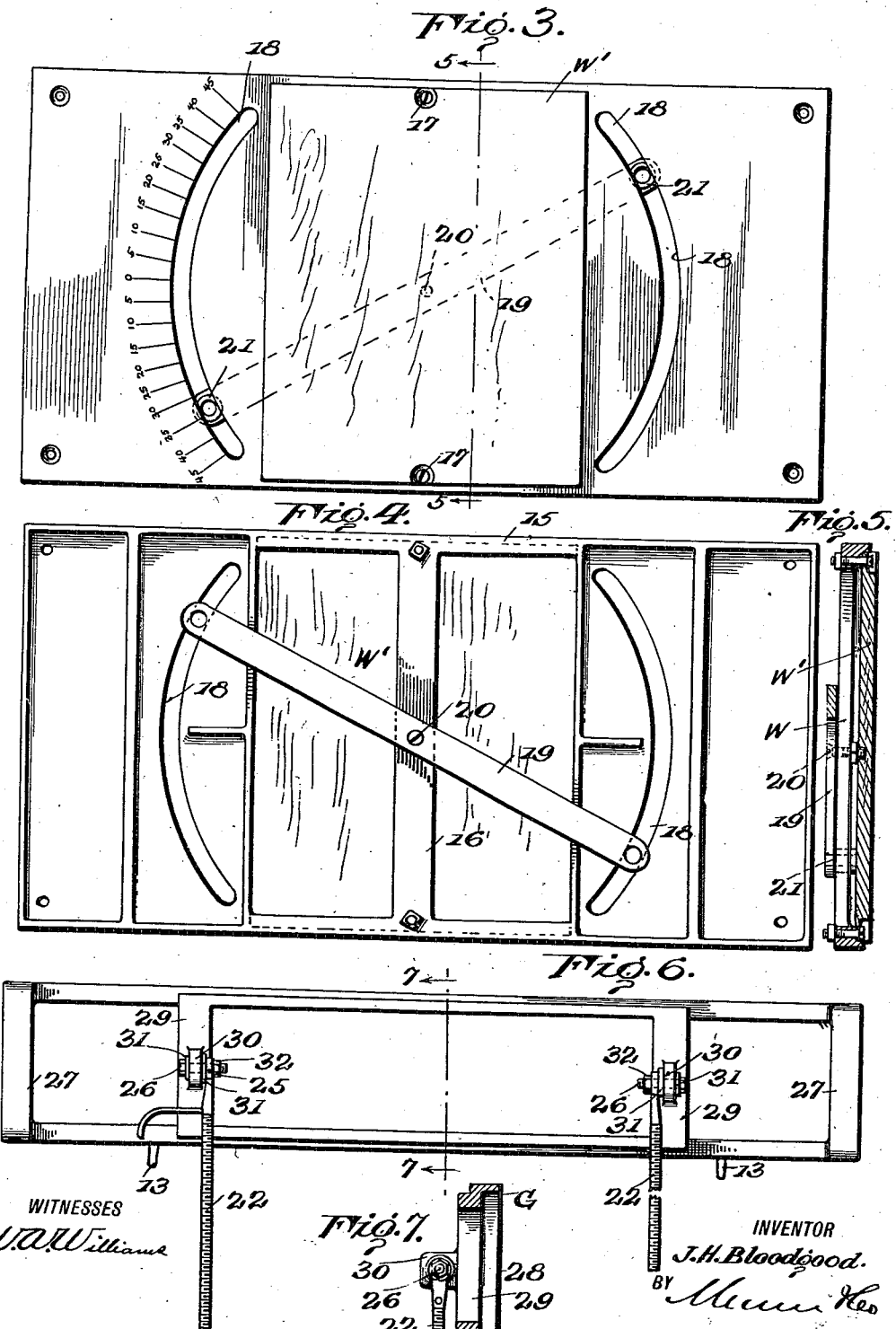

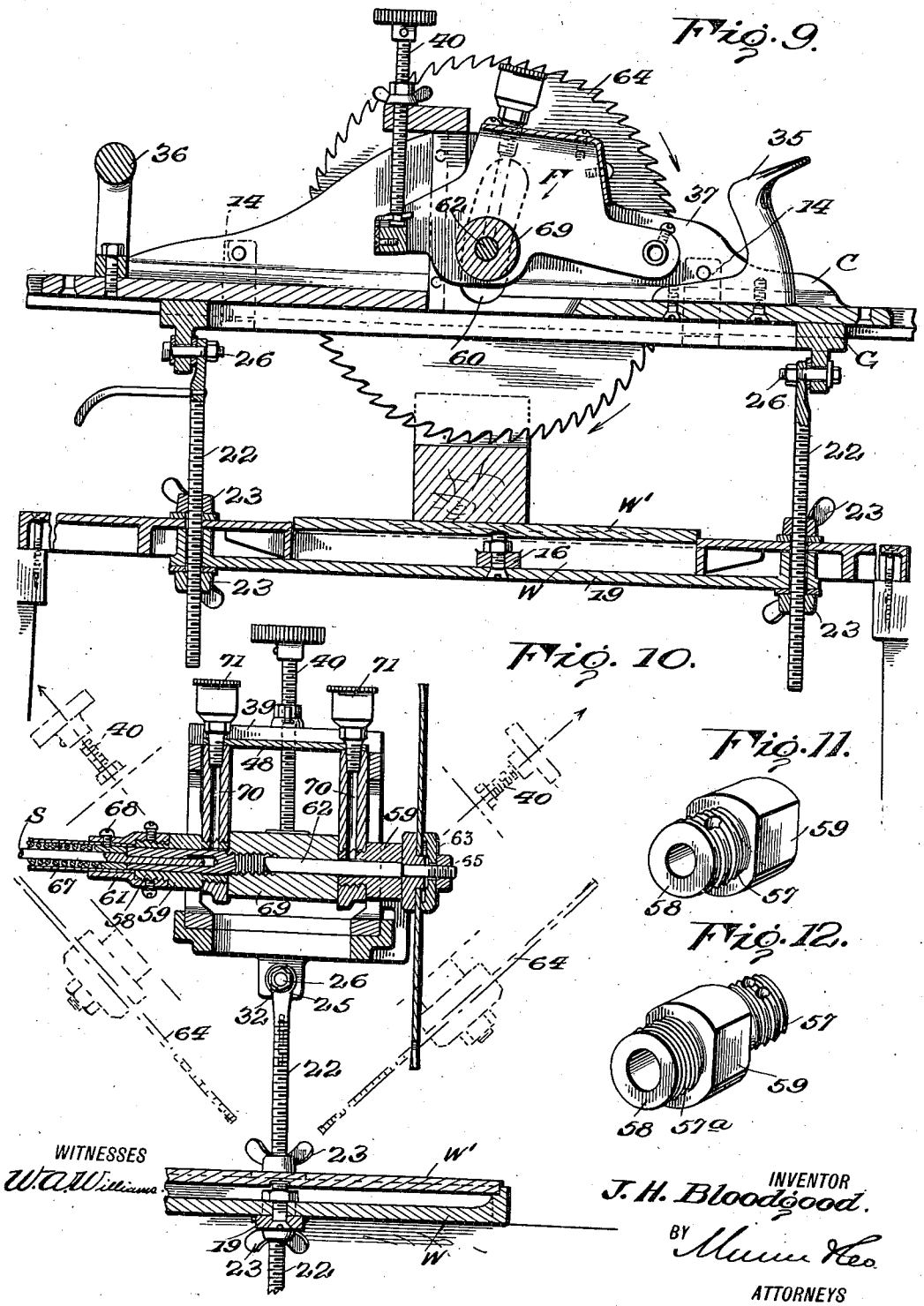

June 5, 1923.
J. H. BLOODGOOD
1,457,492
UNIVERSAL WOODWORKING TOOL
Filed June 2, 1921
7 Sheets-Sheet 4
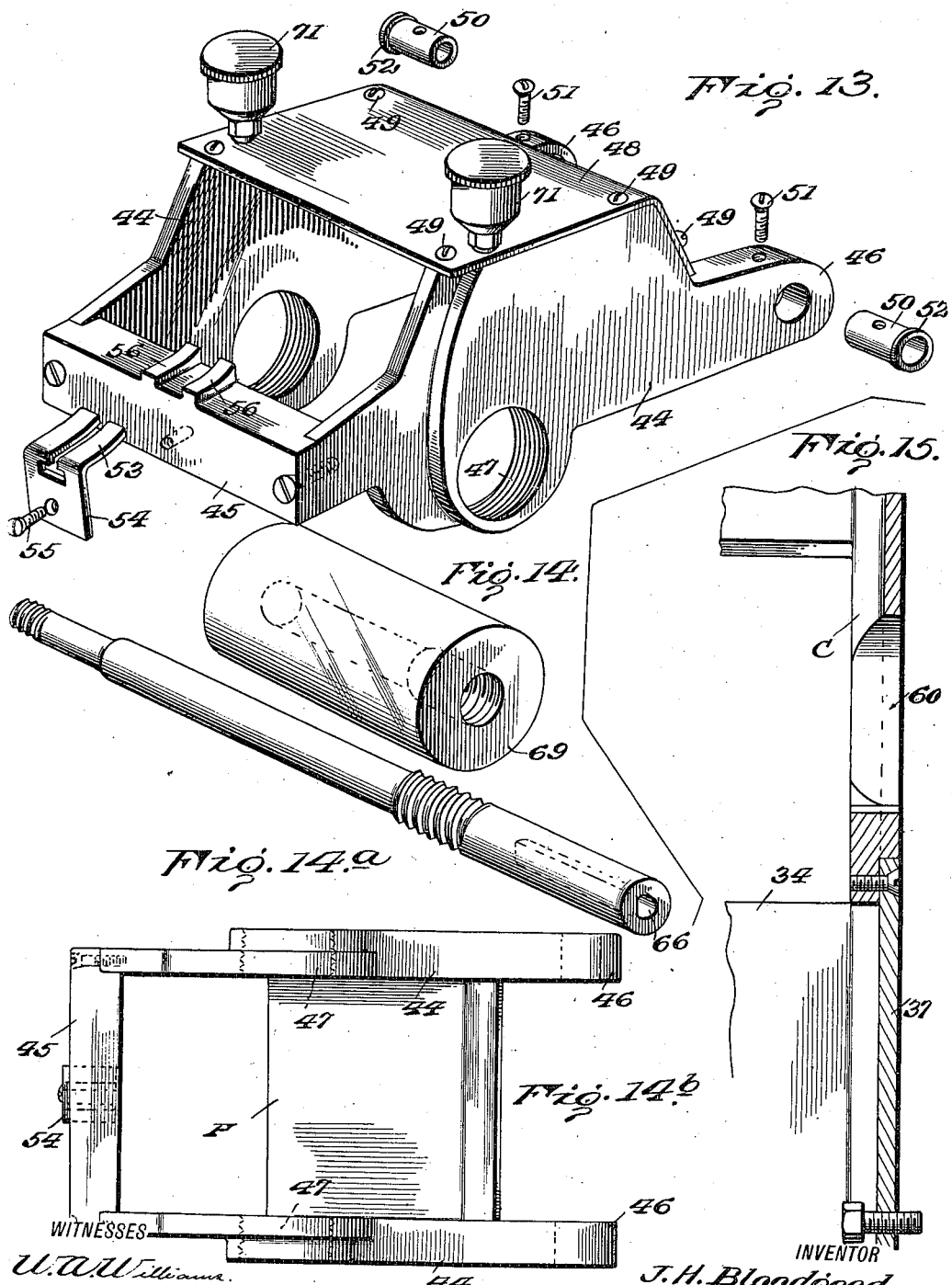

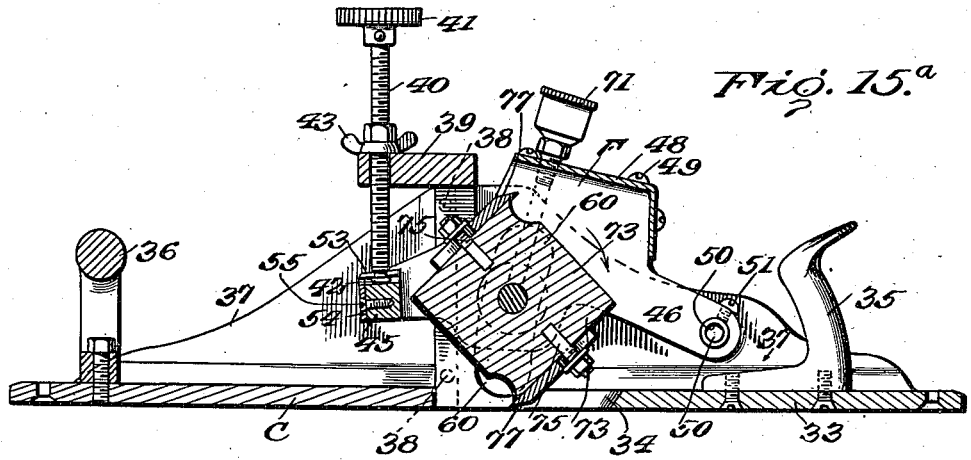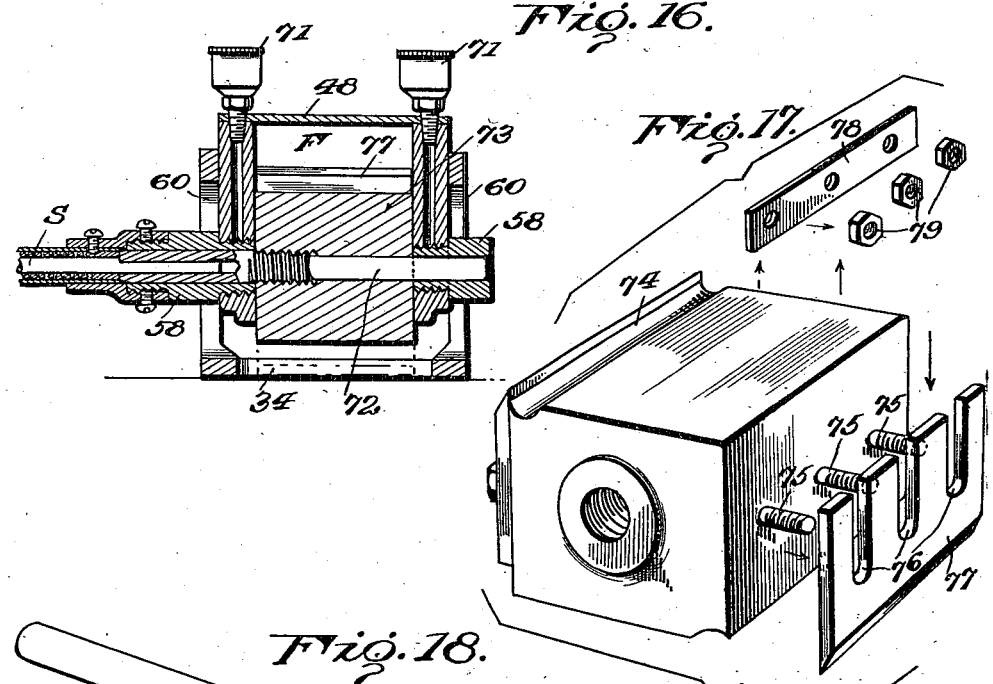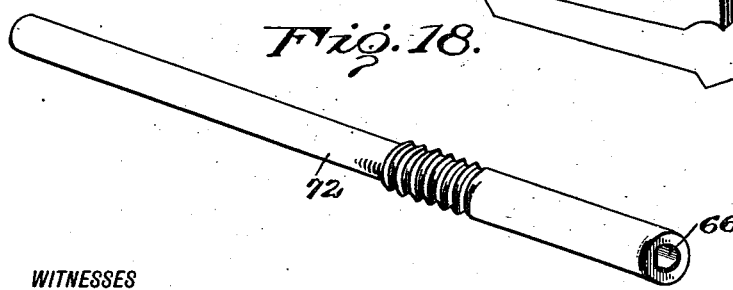

June 5, 1923.
J. H. BLOODGOOD
1,457,492
UNIVERSAL WOODWORKING TOOL
Filed June 2, 1921
7 Sheets-Sheet 6
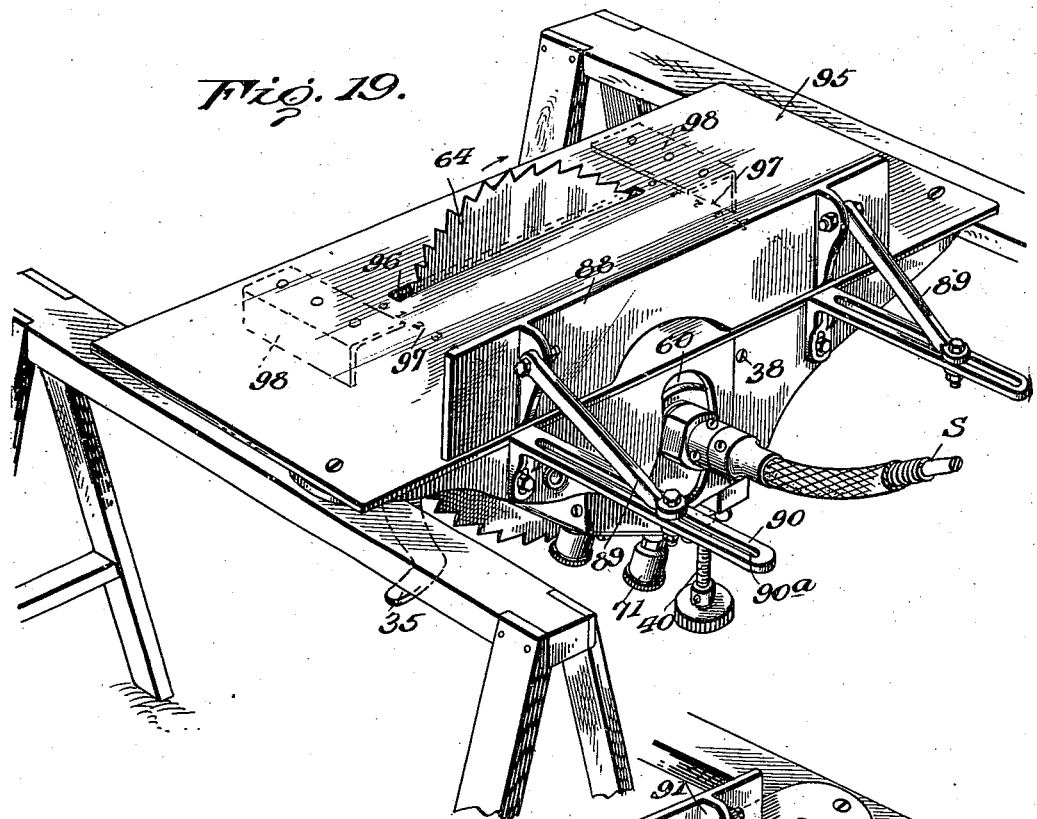
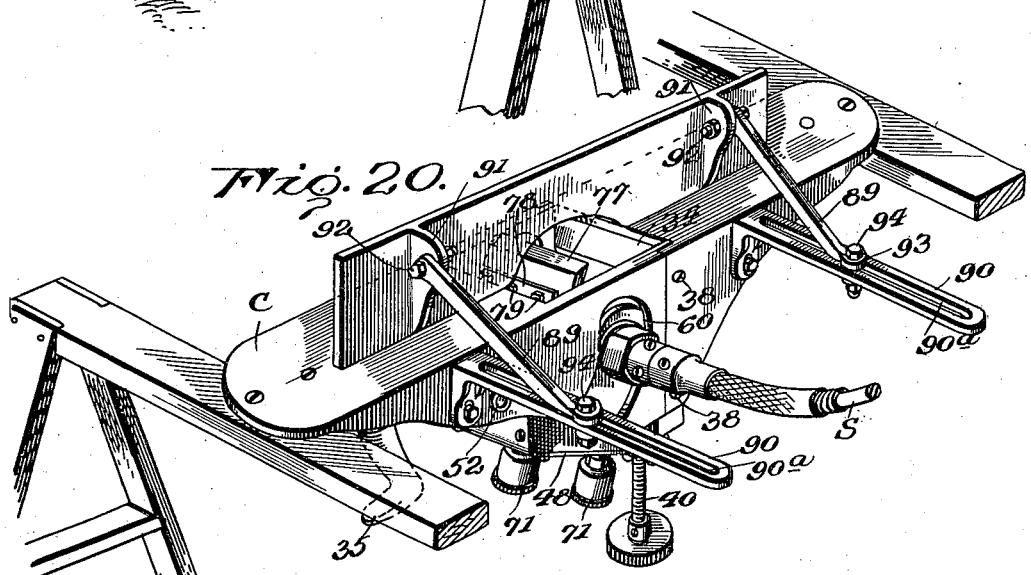

June 5, 1923.

J. H. BLOODGOOD

UNIVERSAL WOODWORKING TOOL

Filed June 2, 1921

WITNESSES
W. A. Williams

INVENTOR
J. H. Bloodgood.
BY
Munn & Co.
ATTORNEYS

Patented June 5, 1923.

1,457,492

UNITED STATES PATENT OFFICE.

JAMES HENRY BLOODGOOD, OF TAMPA, FLORIDA, ASSIGNOR TO J. M. BAKER AND H. L. DOLIVE, BOTH OF TAMPA, FLORIDA.

UNIVERSAL WOODWORKING TOOL.

Application filed June 2, 1921. Serial No. 474,351.

*To all whom it may concern:*

Be it known that I, JAMES H. BLOODGOOD, a citizen of the United States, and a resident of Tampa, in the county of Hillsborough and State of Florida, have invented certain new and useful Improvements in Universal Woodworking Tools, of which the following is a full, clear, and exact description.

My invention relates to woodworking devices, and the purpose of my invention is the provision of a device embodying certain elements which are adapted at times for use with the main elements of the device whereby the device in its entirety is capable of performing with facility and dispatch various forms of work in woodworking.

It is also a purpose of my invention to provide a motor-operated woodworking tool which permits of the substitution of various forms of tools thereto, so that all the major operations in the working of lumber incident to the construction of wooden buildings can be performed with one and the same tool.

I will describe one form of woodworking tool and various forms of attachments therefor, all embodied in my invention, and will then point out the novel features thereof in claims.

In the accompanying drawings:

Fig. 1 is a view showing in perspective one form of woodworking tool embodied in my invention.

Fig. 2 is a perspective view showing the guiding platform comprised in the tool shown in Fig. 1 and the various elements associated with the platform, the latter being disassembled.

Fig. 3 is a back plan view of the worktable comprised in the tool shown in Fig. 1.

Fig. 4 is a bottom plan view of the worktable shown in Fig. 3.

Fig. 5 is a vertical sectional view taken on the line 5—5 of Fig. 3.

Fig. 6 is a bottom plan view of the guiding platform shown in Fig. 1 and the supporting rods therefor.

Fig. 7 is a transverse sectional view taken on the line 7—7 of Fig. 6.

Fig. 8 is an enlarged detail perspective view of one of the guiding brackets shown in Fig. 1.

Fig. 9 is a vertical longitudinal sectional view of the tool shown in Fig. 1.

Fig. 10 is a central transverse sectional view of the tool shown in Fig. 1.

Figs. 11 and 12 are detail perspective views of the bearing sleeves shown in Fig. 10.

Fig. 13 is an enlarged detail perspective view of the tool-carrying frame comprised in the tool shown in Fig. 1, with certain of the parts thereof detached to clearly illustrate the same.

Fig. 14 is a detail perspective view of the spacing sleeve shown in Fig. 10.

Fig. 14$^a$ is a view similar to Fig. 14, showing the tool-supporting shaft shown in Fig. 10.

Fig. 14$^b$ is a top plan view of the tool-carrying frame shown in Fig. 13 with the cover removed.

Fig. 15 is a vertical sectional view through one side of the tool carriage shown in Fig. 1.

Fig. 15$^a$ is a longitudinal sectional view of the tool carriage and frame shown in Fig. 1, with a rotary plane supported in the frame and illustrating one adaptation of my invention.

Fig. 16 is a central vertical sectional view of the tool shown in Fig. 15$^a$.

Fig. 17 is a disassembled view showing in perspective the various parts comprised in the plane shown in Fig. 15$^a$.

Fig. 18 is a detail perspective view of the shaft employed for supporting the rotary plane in the tool shown in Fig. 16.

Fig. 19 is a perspective view showing another adaptation of my invention in which the tool is inverted and a new form of worktable is substituted for the work-table shown in Fig. 1 and with a bracket applied to the table and tool, both embodied in my invention.

Fig. 20 is a view similar to Fig. 19 with the work-table shown therein removed and the guide plate positioned directly on the tool carriage.

Figure 21:
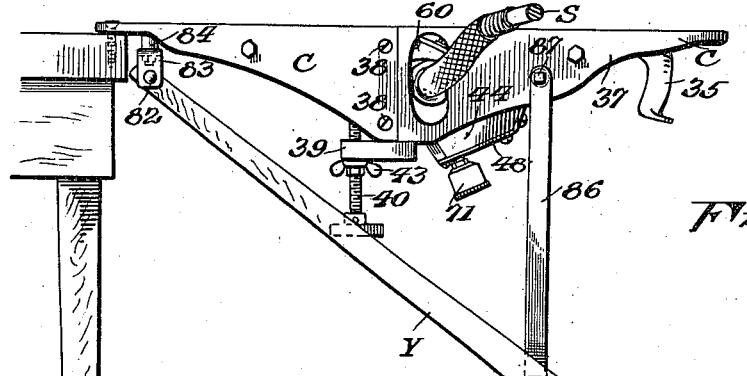

Fig. 21 is a view showing the tool as a planer associated with supporting and operating handles embodied in my invention.

Figure 22:
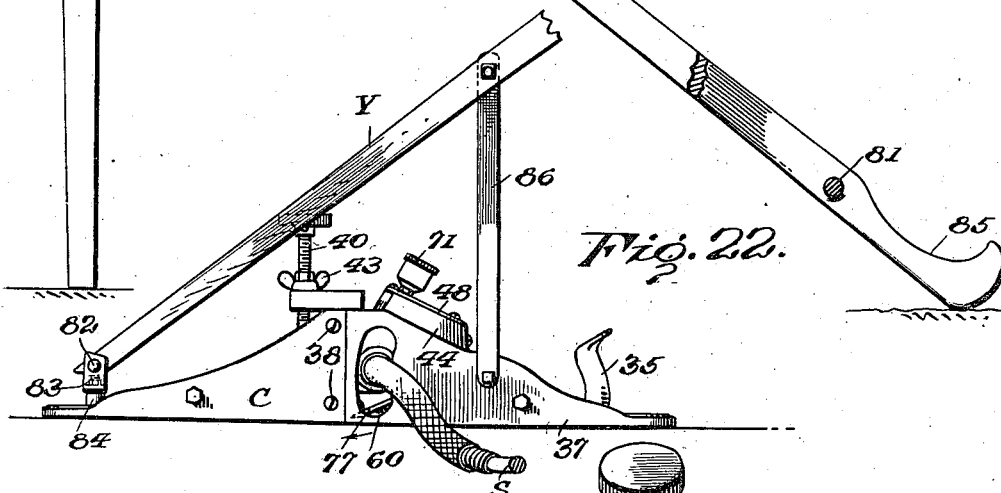

Fig. 22 is a view similar to Fig. 21 with the tool and frame inverted for its adaptation as a floor planer.

Figure 23:
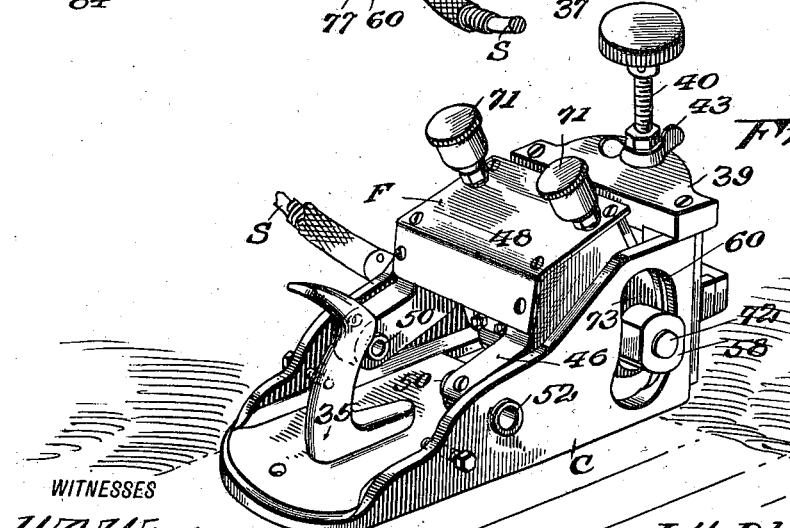

Fig. 23 is a perspective view showing the tool with a portion thereof removed so that the tool can be used for the planing of a floor at points adjacent to the walls.

Similar reference characters refer to similar parts in each of the several views.

Referring specifically to the drawings, and particularly to Fig. 1, the woodworking device in its present embodiment comprises in the main a work-table designated at W, a guiding platform G, a planer-body tool carriage designated generally as C, and a tool-carrying frame designated at F. The frame F carries a tool designated generally as L which, as shown in Fig. 1, is in the present instance a rotary saw adapted to be operated by a motor not shown through the medium of a flexible shaft S.

The work-table W comprises in the present instance a substantially flat casting of metal of substantially rectangular formation, the underside thereof, as shown in Fig. 4, being ribbed for reinforcement purposes. As shown in Fig. 4, the table is provided with a rectangular opening at a point medial of its ends, the side walls of such opening being formed with flanges 15 connected by a crossbar 16. Within this opening is arranged a supplemental work-table designated at $W^1$, preferably formed of wood and secured within the opening by means of screws 17. At opposite sides of the opening, the table W is formed with reversely disposed arcuate slots 18. As shown in Figs. 1 and 3, the work-table is provided with graduations arranged adjacent one of the slots 18 with the medial graduation numbered zero and the remaining graduations numbered in multiples of five up to forty-five and in both directions from the medial graduation. These graduations are for the purpose of determining the angular position of a lever 19 fulcrumed on the cross-bar 16 at the point indicated at 20. The opposite ends of the lever 19 are formed with upstanding collars 21, which are adapted to work in the slots 18, it being understood that the lever is so pivoted that the slots define the movements of the lever ends.

Supporting rods 22 are adapted to extend through the collars 21 of the lever 19 in the manner shown in Fig. 1, these rods being screw threaded to receive the winged nuts 23 at opposite sides of the work-table W, and between which are interposed washers 24 so that the ends can be screwed to tightly embrace the table and to thus lock the rods against movement in the slots. The upper ends of the rods 22 are formed with ears 25 for receiving bolts 26, the latter constituting a portion of the means for securing the guiding platform G upon the rods.

As shown in Figs. 2 and 6, the guiding platform G comprises in the present instance a base 27 of rectangular outline which is provided along its longitudinal edges with upstanding flanges 28. The base 27 is connected at points adjacent its opposite ends with relatively thick crossbars 29 formed with depending ears 30, through which the bolts 26 extend. Washers 31 and nuts 32 are provided with the latter securing the bolts within the ears 25 and 30, and thus clamping the ears together so that the guiding platform as a unit is supported upon the rods. By a loosening of the nuts 32, it will be clear that an adjustment of the platform can be secured so as to occupy various planes with relation to the horizontal. The platform can also be adjusted bodily about a vertical axis as a center through the medium of the rods 22 and irrespective of its angular position.

As illustrated to advantage in Fig. 15$^a$, the planer body C comprises a base plate 33 formed with an opening 34 and provided with handles 35 and 36 by means of which the planer body as a unit is adapted to be manually moved on the platform G. The sides of the planer body are formed with upstanding flanges 37 which gradually increase in width to a point medial of the carriage. For a purpose which will be hereinafter described, the planer body is made up of two sections by dividing it in the manner shown and securing the overlapped ends of the flanges of one section to the flanges of the other section by means of screws 38, as clearly shown in Figures 15$^a$ and 19. The rear section of the planer body is provided at its forward end with a cross-bar 39, in which is threadedly fitted a spindle 40 provided with a knurled head 41 at its upper end and a grooved foot 42 at its lower end. A winged nut 43 threadedly embraces the spindle 40 and abuts the upper side of the crossbar 39 to effect a locking of the spindle against rotation, and consequently in any vertically adjusted position of the spindle.

The tool F, as shown in Figs. 13 and 14, comprises side plates 44 connected at their forward ends by a crossbeam 45. The rear ends of the plates 44 are formed with bearing ears 46 and intermediate the ends of the plates, openings 47 are provided, the walls of which are screw threaded as shown. The side plates 44 are also connected at their upper edges by a cover plate 48, detachably secured thereto by means of screws 49. The tool-carrier as a unit is mounted for vertical swinging movement between the flanges 37 of the planer body by means of sleeve bearings 50, which are locked within the pivot ears 46 by means of screws 51, and which are formed at one end with flanges 52 that are adapted to engage the outer sides of the flanges 37 so that with the screws in applied position the sleeves form a pivotal connection between the tool carrier and the planer body. The tool-carrier is adapted to be locked in any desired position within certain limits by means of the spindle 40, the grooved foot 42 engaging a pair of fingers 53 formed on a plate 54 secured to the crossbeam 45 by a screw 55. The fingers 53 are curved longitudinally and repose on correspondingly shaped projections 56 formed on the crossbeam 45, so that the foot 42 will have sliding engagement with the fingers to allow the necessary movement in effecting the various adjustments of the tool-carrier. It is to be understood that by vertical adjustment of the spindle 40, the forward end of the tool-carrier can be elevated or lowered to any desired position with the frame swinging about the sleeve bearings 50 as a center. Referring now to Fig. 10, it will be seen that the openings 47 receive screw threaded portions 57 of bearing sleeves 58, such sleeves also including heads 59 which have flattened sides to permit their unrestricted movement within arcuate slots 60 formed in the sides 37 of the planer body. The construction of the sleeve bearings 58 is clearly shown in Figs. 11 and 12, and it will be particularly noted that the sleeve bearing shown in Fig. 12 is provided with another threaded extension 57ª, which is adapted to be engaged by a collar 61, as clearly shown in Fig. 10. The sleeves 58 are adapted to receive a shaft 62 which is reduced at one end to accommodate clamping discs 63, between which is adapted to be clamped a disc saw 64. The discs 63 are held in clamping engagement with respect to the saw by means of a nut 65 mounted on the end of the shaft 62. The opposite end of the shaft is provided with bore 66, having a flattened portion as clearly shown in Fig. 14ª for receiving a correspondingly shaped end of the flexible shaft S. As shown in Fig. 10, the shaft S includes a casing 67 which is secured within the collar 61 by a screw 68. By virtue of the flattened end of the shaft S and the bore 66, the shaft 62 is connected to the shaft S for rotation therewith and to thereby effect rotation of the saw 64. A spacing sleeve 69 embraces the shaft 62 at a point between the plates 44 of the frame F, and as clearly shown in Figs. 10, 14 and 14ª, the shaft has threaded engagement with the sleeve and in such manner that when the shaft is rotated the thread will serve to lock the sleeve to the shaft for rotation therewith, so that the proper operation of the shaft within the tool is insured. The foregoing construction permits of the positioning of the saw 64 and the shaft S at either one side of the tool-carrier or the other, the purpose of this reversibility of these elements being to permit the operation of the saw at either side of the tool, as will be more fully described hereinafter.

For the purpose of lubricating the shaft 62 grease ducts 70 are formed in the side plates 44 of the tool-carrying frame, these ducts communicating at their lower ends with suitable openings formed in the sleeve bearings 58 and at their upper ends with grease cups 71. This arrangement permits of the introduction of grease to the bearings 58 and to thereby effect a thorough lubrication of the shaft.

In the operation of the device thus far described, the material to be worked, such as the board shown in Fig. 1, is adapted to be placed upon the supplemental work-table W¹ so that when using the rotary saw the possibility of the saw-teeth striking the metal part of the work-table is prevented. The work-table as a unit is adapted to be secured by the screws shown in the corners of the table to any suitable support, and in such manner that free lateral movement of the rods 22 can be effected. With the work in proper position upon the table and the saw 64 rotating, the planer body C is moved along the platform by the operator gripping the handles 35 and 36, thus causing the saw to travel across the work. The movement of the planer body C on the platform G is limited in both directions by means of a pair of guide brackets 14 which are detachably secured to the sides 37 by means of screws, as clearly shown in Fig. 1. In the present instance, I have shown two guide brackets, each of which is formed with a groove, as clearly shown in Fig. 8, for the purpose of accommodating the flanges 28 of the platform G. The guide brackets 14 are adapted to engage stop pins 13, removably fitted within the flanges 28 of the platform G and to thereby limit the movement of the planer body C longitudinally within the platform G.

The depth of the cut made by the saw 64 is determined by an adjustment of the frame F through manipulation of the spindle 40, as has been described, while the angle of the cut is determined by an adjustment of the platform G through an adjustment of the rods 22 in the slots 18. By virtue of the graduations on the work-table, the angular adjustment of the saw can be accurately determined so as to effect a cutting of the work at the desired angle. With the platform positioned as shown in Fig. 1. the saw 64 occupies a position perpendicular with respect to the work so that a vertical cut is effected. If it is desired to effect an undercut of the work at any angle greater or less than a right angle, the saw can be adjusted to effect such a cut by an angular adjustment of the platform upon the supporting rods 24. This is accomplished through a loosening of the nuts 32, as has been described.

In the position of the saw as shown in Fig. 1, the tool is arranged for operation by a right-handed person. However, by a reversal of the saw to the opposite side of the carriage, and the changing of the shaft S to that side of the carriage formerly occupied by the saw, the tool can then be operated by a left-handed person.

Although I have specifically described and shown a rotary saw mounted for operation by the tool, it is to be understood that any other form of woodworking tool can be positioned upon the shaft 62 in place of the rotary saw 64; for example, the saw may be supplanted by an abrasive wheel such as a sandpaper wheel for effecting the finishing of the various forms of work, it being manifest that by the various adjustments which it is possible to obtain the abrasive wheel can occupy any desired position so as to reach the most inaccessible parts of a piece of work.

Referring now to Figs. 15ᵃ to 18 inclusive, I have here shown the woodworking tool adapted for use as a motor-operated planer. In this adaptation of the invention, the work-table W and the guiding platform G are no longer used, and the shaft 62 is replaced by a shaft 72 which has threaded engagement with the bore of a planer block 73. As illustrated to advantage in Fig. 17, the block 73 is of substantially rectangular formation with semicircular grooves 74 formed on two of its sides adjacent two of its corners. Extending from the ungrooved sides of the block are a plurality of threaded extensions 75, which are adapted to loosely fit in slots 76 formed in cutting blades 77. A pair of plates 78 are arranged upon the outer sides of the blades 77 so as to receive the projecting ends of the extensions 75. Engaging the projecting ends are nuts 79 which, when properly adjusted upon the extensions, engage the plates 78 and securely clamp the two blades upon the block. By virtue of the slots 76, the blades can be adjusted by loosening the nuts 79 so that the cutting edges of the blades project a predetermined distance from the block. As shown in Figs. 15ᵃ and 17, the cutting edges of the blades are disposed adjacent the groove 74, the latter being provided for the purpose of allowing the free passage of the shavings from the edges of the blades. As shown in Fig. 16, the opposite ends of the shaft 72 are journaled in the bearing sleeves 59 with one end of the shaft operatively connected to the actuating shaft S.

By virtue of the adjustability of the tool carrier F, the planer can be adjusted so as to secure a cut of any desired depth, and by reciprocating the planer in the usual manner it would be clear that with continuous rotation of the block the cutting blades will effect a planing of the wood during rearward as well as forward movement of the tool.

Referring now to Figs. 21 and 22, I have shown the tool in its adaptation as a planer provided with supporting and operating handles and connected to the tool so that it can be supported in an inverted position, as shown in Fig. 21, or operated as a floor planer, as shown in Fig. 22. The handles in the present instance comprise a pair of beams 80 which are secured in V-shaped formation by crossrod 81 to the bolt 82, the latter extending through the meeting ends of the beams and carrying a bracket 83 secured to the forward end of the tool by a bolt 84. The spaced ends of the beams 80 are formed with hand holds 85, and connected to the beams intermediate their ends are brace-rods 86, also connected to the planer body 37 of the carriage by means of bolts 87, which fit in holes provided in the sides.

As an operating member, the handles Y are successfully used in moving the planer over the surface of a floor, it being understood that the hand holds 85 are gripped by the operator in effecting a vertical or rearward movement of the planer. As shown in Fig. 21, the handles are employed as a support for holding the planer in inverted position so that the work to be planed can be moved over the bottom surface of the planer body C. To this end the forward end of the planer body C, which is provided with screw holes, as clearly shown in Fig. 20, is secured to a table or other suitable support by means of a screw so that in conjunction with the yoke arranged so that the handles 85 come in contact with the ground, the planer is securely held in a horizontal position.

Referring now to Fig. 23 the woodworking tool in its adaptation as a planer is shown with the forward section of the planer body removed to permit of the planer effectively planing the surface of a floor adjacent the walls of a room, it being particularly noted that the planer head is disposed at the forward end of the rear section of the carriage, so that with the vertical section removed the cutting blades can work in close proximity to those portions of a floor adjacent the wall or baseboard.

In Fig. 20 I have shown the woodworking tool still in the character of a planer in inverted position as in Fig. 21, but devoid of the yoke. In its stead, the planer is supported in a horizontal position between a pair of carpenter horses with the screws extended through the opposite ends of the planer body and engaging the horses for rigidly sustaining the tool in an inverted position. In this embodiment of my invention, the planer is provided with a guide plate 88 adjustably supported in an upstanding position upon the planer by arms 89 working in brackets 90. One end of the arms 89 are pivotally connected to ears 91 formed in one side of the plate 88, and through which bolts 92 extend. The opposite ends of the arms are formed with collars 93 through which bolts 94 extend. These bolts also extend through slots 90ᵃ formed in the brackets 90, and have sliding movement therein to permit of a longitudinal adjustment of the arms 89 on the brackets of the plate 88. The brackets 90 are detachably secured to one side of the planer body C by means of the bolts which were employed for securing the guide brackets 14 to the carriage.

In the operation of the planer, as shown in Fig. 20, the work to be planed is moved across the bottom of the planer body with one edge of the work engaging the guide plate 88. It will therefore be seen that by adjustment of the guide plate 88, the exact point at which the work will be engaged by the blades on the planer can be readily determined. The tool in this adaptation is particularly designed for forming beads, grooves, rounding edges of work, and mortising work of any character.

Referring now to Fig. 19, the woodworking tool is shown in the same position as in Fig. 20, only in the present instance the tool is again converted into a rotary saw. In this embodiment of my invention, I employ another form of work-table designated by 95, which consists of rectangular plate of metal formed with a slot 96. Numerals 97 are imprinted or otherwise affixed on the surface of the table in the manner shown with the numerals arranged in sets from zero to six, with any two adjacent numerals of any one set spaced apart the distance of an inch. The zero of each set is in alignment with the slot 96, while the remaining numerals are arranged to indicate the distance in inches from one side of the slot. As shown, the saw 64 projects through the slot 96 so as to be exposed and engaged by a piece of work moved longitudinally across the work-table in effecting a sawing of the work. The guide plate 88 is adapted for use in conjunction with the work-table 96 in determining the position of the work with respect to the saw, so that the latter will effect a cutting of the work at a predetermined point. The position of the plate 88 with respect to the saw 64 can be accurately determined by the numerals 97, and with the edge of the work engaging the guide plate it will be clear that the work will be cut at a point dependent upon the adjustment of the guide plate. For the purpose of preventing the saw horses from being pushed from beneath the work-table and, against the saw during the operation of the saw, shields 98 are secured to the under side of the table 95 in the manner shown in dash lines in Fig. 19.

From the foregoing description, taken in conjunction with the accompanying drawings, it will be manifest that the woodworking device, together with its several attachments, is capable of universal use in the treatment of woodwork, and that the attachments are so constructed and associated with the main elements of the device as to permit of the ready conversion into any character of rotary woodworking tool. By virtue of the several adjustments of the tool, various forms of work can be performed at any desired angle with relation to the work, and by a reversal of certain elements as has been described the tool can be arranged so as to accommodate itself to a right or left-handed operator.

Although I have herein shown and described only one form of woodworking tool and various forms of adjustments therefor, it is to be understood that various changes and modifications may be made herein without departing from the spirit of the invention and the spirit and scope of the appended claims.

What I claim is:

1. A woodworking device comprising a work table, a guiding platform adapted to be supported in spaced relation above said table, supporting rods pivotally connected to the platform adjacent its opposite ends, said rods in movable relation with the table being vertically adjustable therethrough and laterally adjustable in arcs, whereby the platform can be adjusted vertically in a vertical plane, transversely in a horizontal plane, or tipped transversely to any angle between vertical and horizontal, and whereby a free passage for work on the work-table between such adjusting means is provided, and a tool carriage body mounted for reciprocating movement on said platform.

2. A woodworking device comprising a work-table, a guiding platform, a tool carriage body mounted for reciprocating movement on said platform, a tool-carrying frame vertically adjustable in the tool carriage body, a rotary tool carried by the frame, a means for adjusting the guiding platform laterally and also about a vertical axis comprising supporting rods pivotally connected to the guiding platform to allow transverse rocking movement thereof, slots formed in the work-table, a lever fulcrumed on the work-table, said rods extending through said slots and connected to the opposite ends of said lever, and means carried by the rods and engaging the work-table for supporting the rods within the slots and at the same time permitting lateral and vertical adjustments thereof.

3. A woodworking device comprising a work-table having arcuate slots formed therein, graduations on the table adjacent one of the slots, a lever fulcrumed on the table and having its ends arranged to move in arcs corresponding to the arcs of the said slots, rods extending through said slots and through the ends of said lever, means carried by the rods for adjusting the latter vertically within the slots and for securing the rods against lateral movement within the slots, a guiding platform horizontally pivoted on the rods to allow of transverse adjustment of the platform, and a rotary tool mounted for reciprocating movement on the platform.

4. A woodworking device comprising a work-table having reversely arranged arcuate slots therein, graduations adjacent one of the slots, a supplemental work-table on the main work-table between said slots, a lever fulcrumed on the under side of the main work-table so that its ends describe paths of movement corresponding in curvature to said slots, sleeves formed on the opposite ends of the lever, rods extending through said slots and through said sleeves, nuts mounted on the rods and engageable with said table and lever for clamping the rods and lever in any adjusted position, a guiding platform pivoted on a horizontal axis on the upper ends of the rods and in any adjusted position, and a carriage mounted for reciprocating movement on the platform, and a rotary tool sustained on the carriage.

Tampa, Florida, May 31, 1921.

JAMES HENRY BLOODGOOD.

Witnesses:
H. L. DOLIVE,
L. D. NASH,
E. R. BOHANNON.